WALTER E. HUBER
JAMES W. HUFF
HAROLD N. GRUSHON
INVENTORS

Reuben Wolk
ATTORNEY

May 24, 1966   W. E. HUBER ET AL   3,252,846
METHOD FOR COVERING BELTS
Original Filed July 13, 1960   2 Sheets-Sheet 2

WALTER E. HUBER  INVENTORS
JAMES W. HUFF
HAROLD N. GRUSHON
BY

Reuben Wolk
ATTORNEY

United States Patent Office 3,252,846
Patented May 24, 1966

3,252,846
METHOD FOR COVERING BELTS
Walter E. Huber and James W. Huff, Springfield, Mo., and Harold N. Grushon, Dayton, Ohio, assignors to Dayco Corporation, Dayton, Ohio, a corporation of Ohio
Original application July 13, 1960, Ser. No. 42,523. Divided and this application Dec. 16, 1964, Ser. No. 424,874
1 Claim. (Cl. 156—201)

This application is a division of U.S. patent application Serial No. 42,523, filed July 13, 1960.

This invention relates to a method and a machine for applying two or more outer coverings to belts. More particularly, the invention relates to a mechanism for applying covering jackets to discontinuous or endless belts.

In the art of manufacturing driving belts such belts are often made by manufacturing a core or carcass compounded of rubber and strength cords. Frequently this core is then covered by one or more covers or jackets of rubberized fabric, that is, fabric which has been built up by skim coating or frictioning with rubber. The core is usually built up on a drum into any of several varied cross-sectional dimensions or lengths. If discontinuous belts are being manufactured, these cores are usually fabricated on drums and then cut off spirally to provide a discontinuous length which may be as great as 780 inches, or, if desired, splices may be used to make the belt of any desired length. It is then necessary to pass the belts through a machine which applies a cover or jacket about the finished core. In the prior art there have been many machines for covering belts of the endless type, but the present invention is directed to a machine which is capable of providing two or more covers to such endless belts by passing the belt through the machine only one time instead of many times as previously required. Further, the present invention is directed to a mechanism which is capable of applying two or more covers to a belt of indefinite length as discussed above, by passing the belt through machinery only a single time.

In the prior art many machines have been devised which have been capable of applying a plurality of covers by repeating the passage of an endless belt through the same portion of the mechanism. Such devices have been shown in U.S. Patent No. 1,827,674, issued to J. A. Shively, U.S. Patent No. 2,529,859, issued to R. R. Amblet et al., and U.S. Patent No. 2,579,822, issued to O. F. Homeier et al. However, for the first time the present inventors have devised a mechanism which can apply any number of covers in a single passage through the machine and also have for the first time devised a machine which can apply such covers to a belt of indefinite length.

It is a primary object of the invention, therefore, to provide a new improved mechanism for covering either endless or discontinuous belt bodies of varying cross-sectional dimensions.

It is another object of the invention to provide a machine for applying two or more such covers to the belt body in a single passage through the machine.

It is a further object of the invention to provide means for continuously feeding both the belt body and the belt cover through the machine to permit continuous covering.

It is another object of the invention to provide a method for applying a plurality of covers to a belt body during a single passage through a machine.

These and other objects of the invention will be further described in the following specification and claims, and are illustrated in the drawings in which:

Figure 1:
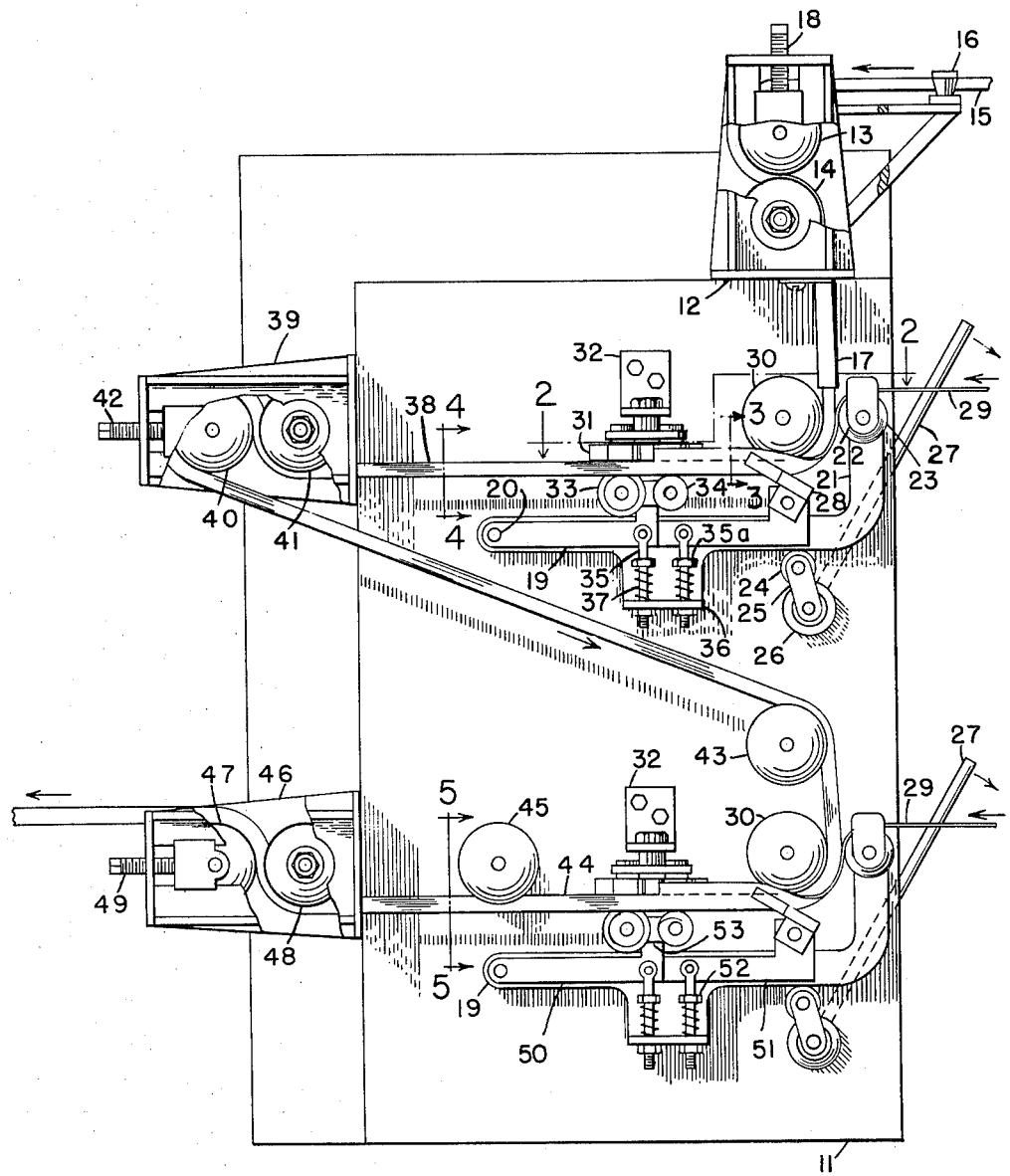
FIGURE 1 is a front elevational view of the novel mechanism with portions broken away for clarity.

Referring now to the drawings, FIGURE 1 illustrates the novel mechanism including a framework 11 which is essentially a rectangular plate-like member upon which are mounted the various components. On the upper portion of the framework is mounted a bracket 12 upon which are mounted pulleys 13 and 14 which serve as the feed members for a belt body 15, which is at this point uncovered. As shown in this drawing, the belt body 15 passes from right to left past a pair of guide rollers 16 which maintain it in to alignment until it reaches the pulleys 13. The pulley 13 and 14 as shown are mounted one above the other so that the belt body may pass over the upper pulley 13, between pulleys 13 and 14, then around pulley 14, then passing out through the bottom of the bracket 12 through guide member 17. By means of a threaded adjusting member 18 it is possible to vary the relative position of the pulleys 13 and 14 and thus impose more or less tension upon the belt body.

Figure 6:
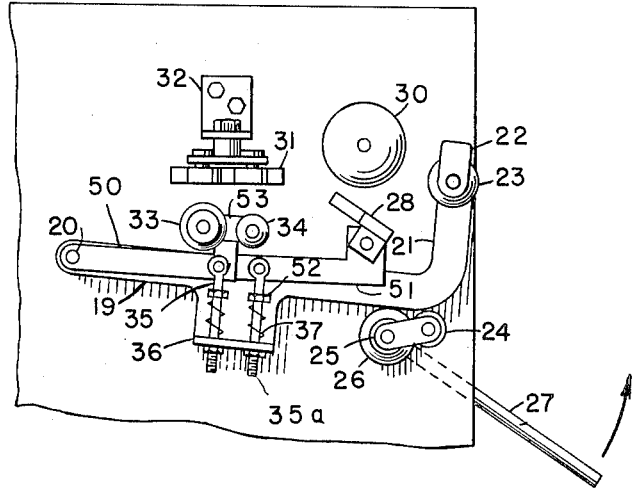
FIGURE 6 is a front elevational view of a portion of the mechanism shown in FIGURE 1, with the mechanism in an operative position.

Mounted on the framework below the bracket 12 is the belt covering mechanism consisting of arm 19 which is pivotally mounted upon the framework by means of a fastening member 20. The arm 19 extends horizontally to its right-hand extremity at which point it forms a right angle bend to form a vertical component 21, terminating in a guide member 22 and a roller 23 mounted upon the upper end of said extremity. The entire arm rests upon another roller 24 which is pivotally mounted on a short arm 25 which in turn is pivotally mounted upon a member 26 that is attached to the framework by a conventional means such as bolting, or the like. A handle 27 is attached to the arm 25 in such a fashion that actuating this arm in the direction shown by the arrow in FIGURE 6 will move the arm 19 and the remaining mechanism from the inoperative position shown in FIGURE 6 into a position of operation or engagement shown in FIGURE 1. Actuation of the arm 27 in the opposite direction as indicated by the arrow in FIGURE 1 causes the arm 25 to swing down and thus allow the arm 19 to drop downward, pivoting around the point 20 and thus become disengaged.

Figure 2:
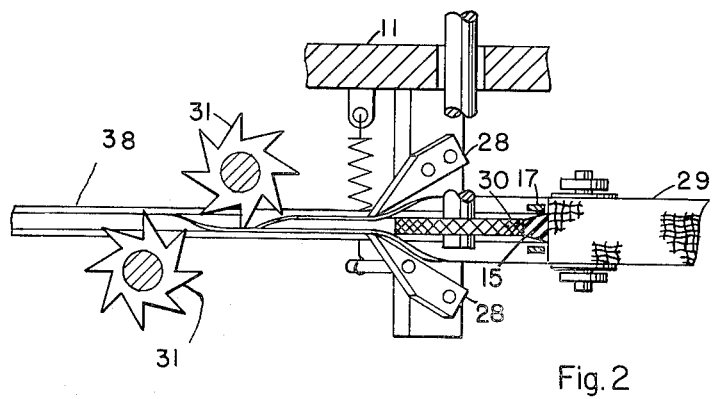
FIGURE 2 is a section taken along lines 2—2 of FIGURE 1.
Figure 4:
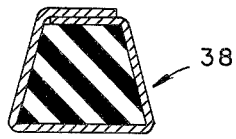
FIGURE 4 is a sectional view of the covered belt taken along lines 4—4 of FIGURE 1.
Figure 3:
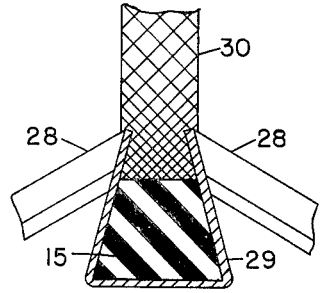
FIGURE 3 is a section of the belt and mechanism during the covering operation taken along lines 3—3 of FIGURE 1.

A second and a third arm 50 and 51 are also pivotally mounted on the framework by the same member 20 that mounts the arm 19. Arm 51 is in front of arm 19 and extends to the right, terminating in an upstanding portion; while arm 50 is in front of arm 51 and is still shorter, also terminating in an upstanding portion. A bracket 36 is an integral part of and below arm 19 and on this bracket is mounted a pair of studs 35 and 35a by means of bolts. The studs extend upwardly, the upper end of stud 35 mounted on arm 50, and the upper end of stud 35a mounted on arm 51. Each stud has a compression spring 37 mounted thereon between the bracket 36 and retainer nut 52, the spring maintaining an equalizing force between arm 19 and the arms 50 and 51. The actuation of the arm 19 as described above will also swing arms 50 and 51, rollers 33 and 34, and guide members 28 into the FIGURE 1 position for operation. A supply of covering material is passed from a supply roll (not shown) into the mechanism as shown, and is used to form the cover 29. Mounted upon the upstanding portion of arm 51 are two guide members 28 which initiate the wrapping of cover 29 around belt body 15 as shown in FIGURES 1, 2 and 3. The cover 29 is fed over the roller 33 and through guide means 22, which places the cover under the belt body. The cover is then passed between guide members 28 and under roller 30 mounted over the guide members, thus partially wrapping the belt body as shown in FIGURE 3 by making the cover contiguous with the bottom and sides of the belt body. A bracket 32 is mounted on the framework over the belt body on which is mounted a pair of toothed members 31. Mounted on the upstanding portion of arm 50 under members 31 is a horizontal arm 53, upon which are mounted rollers 33 and 34. The partially wrapped body passes over the rollers which support it, while the rotation of members 31 caused by passage of the upstanding portion of the belt cover, causes the portion of the cover extending above the sides of the belt body to be forced into the position shown in FIGURE 4, so that the cover is now also contiguous with the upper surface of the belt. As shown in FIGURE 3, it is the consecutive action of the teeth of these gears which operate to force the cover down upon the belt body as it is supported by the rollers 33 and 34.

Figure 5:
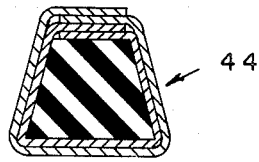
FIGURE 5 is a sectional view of the belt illustrating the addition of a second cover and taken along lines 5—5 of FIGURE 1.

After the initial covering steps, the now completely covered belt 38 passes into another bracket 39 upon which is mounted a pair of tensioning pulleys 40 and 41 and an adjustment 42. This mechanism functions very similarly to the pulleys 13 and 14 and adjustment 18, and provides support and tension to the belt as it passes downward and to the right around another pulley 43 which is mounted on the framework directly below the wrapping mechanism. From here the belt 38 passes downward around another roller 30 and then through a wrapping mechanism which is a duplicate of the one described above. The components of this system are numbered similarly to the one already described and the operation is identical except that this provides a second cover or wrapping 29 around the belt similar to the initial one. The finished belt 44, which is now shown in section in FIGURE 5, then passes under pulley 45 to another bracket 46 in which are mounted pulleys 47 and 48 and adjustment member 49, which act in a fashion similar to the other sets of pulleys and adjustments already described. The belt then leaves the final set of tensioning members and passes on to a take-up roll (not shown).

The device described above is comparatively simple to operate as it is only necessary to begin to feed the belt body 15 into the pulleys 13 and 14 mounted on the upper portion of the mechanism from whence it is guided down to the covering portion of the device. By actuating the handle 27 as described, this wrapping mechanism is now engaged and the cover 29 is likewise brought between guide 22 and roller 23 so that it begins to envelop the belt body. As the two members pass together within the mechanism, the members 28 and 30 combine to provide an initial wrap while the members 31 complete the operation by providing a completely wrapped belt. This product then passes on to the lower portion of the wrapping mechanism wherein the process is duplicated in order that a double wrapped belt may thus be provided.

The mechanism and process described are completely new to the art as it is the first time that a belt may be covered with a multiple wrap by applying all wrappings successively without the need for passing the belt through the same portion of the machine. The result is an improved product made with economy of time, without the need for more than one machine, or the need of stopping the machinery in order to perform these steps. By means of this, belts of indefinite length can be passed through the machine and wrapped and then stored in this wrapped fashion in order that they may be at some later time cut to length and attached by means of conventional belt fasteners. It should be noted that the number of wrappings is not limited to two as shown, but that three, four or more such wrappings could be applied by modifying the mechanism.

The mechanism described above is exemplary of the type of machine that could be used and the retails shown therein are considered typical but by no means limiting on the principle behind the invention.

We claim:

A method of applying a plurality of covers of rubberized fabric to a belt body comprising the steps of continuously feeding said belt body, wrapping a portion of a first cover about said belt body, simultaneously applying a portion of a second cover about the previously wrapped portion of said belt body, continuously wrapping other portions of said first cover about other portions of said belt body, and simultaneously applying other portions of said second cover about said other previously wrapped portions of said first cover on said belt body.

References Cited by the Examiner

UNITED STATES PATENTS

| 1,747,856 | 2/1930 | Burkley et al. | 156—460 X |
| 1,827,674 | 10/1931 | Shively | 156—460 |
| 2,093,206 | 9/1937 | Muller | 156—148 X |
| 2,579,822 | 12/1951 | Homeier et al. | 156—467 |
| 2,810,424 | 10/1957 | Swartswelter et al. | 156—393 X |

EARL M. BERGERT, *Primary Examiner.*

P. DIER, *Assistant Examiner.*